United States Patent
Fukui et al.

(10) Patent No.: US 6,440,598 B1
(45) Date of Patent: Aug. 27, 2002

(54) SEPARATOR FOR LOW TEMPERATURE TYPE FUEL CELL AND METHOD OF PRODUCTION THEREOF

(75) Inventors: Yasushi Fukui; Masanori Matsuno; Minoru Saito, all of Sakai (JP)

(73) Assignees: Nisshin Steel Co., Ltd.; Toyota Jidosha Kabushiki Kaisha, both of (JP)

( * ) Notice: Subject to any disclaimer, the term of this patent is extended or adjusted under 35 U.S.C. 154(b) by 0 days.

(21) Appl. No.: 09/529,146

(22) PCT Filed: Oct. 13, 1998

(86) PCT No.: PCT/JP98/04607

§ 371 (c)(1),
(2), (4) Date: Apr. 7, 2000

(87) PCT Pub. No.: WO99/19927

PCT Pub. Date: Apr. 22, 1999

(30) Foreign Application Priority Data

| Oct. 14, 1997 | (JP) | 9-280252 |
| Oct. 21, 1997 | (JP) | 9-288927 |
| Oct. 21, 1997 | (JP) | 9-288928 |
| Nov. 11, 1997 | (JP) | 9-308180 |

(51) Int. Cl.⁷ .............................. H01M 2/00

(52) U.S. Cl. .............. 429/34; 429/30; 429/38; 429/39; 29/623.5

(58) Field of Search .................. 429/34, 38, 39, 429/30; 29/623.5

(56) References Cited

U.S. PATENT DOCUMENTS 6,291,094 B1 * 9/2001 Yoshimura et al. ............ 429/34

FOREIGN PATENT DOCUMENTS

| JP | 05109415 | 4/1993 |
| JP | 07272731 | 10/1995 |
| JP | 08180883 | 7/1996 |
| JP | 09022708 | 1/1997 |
| JP | 09245808 | 9/1997 |
| JP | 10255823 | 9/1998 |
| JP | 10308226 | 11/1998 |
| JP | 10308226 A * | 11/1998 | ............ H01M/8/02 |

OTHER PUBLICATIONS

"Polymer Electrolyte Fuel Cell," OHM techno–guidance '95/2 (8 pp.).

"Polymer Electrolyte Fuel Cell," Fuji Jihoh vol. 68, No. 3 (1995) (12 pp.).

* cited by examiner

Primary Examiner—Patrick Ryan
Assistant Examiner—Angela J. Martin
(74) Attorney, Agent, or Firm—Webb Ziesenheim Logsdon Orkin & Hanson, P.C.

(57) ABSTRACT

A separator for a low-temperature fuel cell comprises a stainless steel substrate S having a surface to which carbonaceous particles such as graphite particles GP or carbon black aggregates CA adhere with dotted distribution. The carbonaceous particles are preferably bonded through a diffusion layer DL to the surface of the substrate S. The carbonaceous particle-dispersed layer may be a plating layer in which graphite particles GP or carbon black aggregates CA are dispersed or formed by thermal decomposition of organic components in a carbonaceous particle-dispersed paint applied to the surface of the substrate S. Since carbonaceous particles free from oxide films adhere to the surface of the acid-resistant stainless steel substrate S, contact resistance of the separator is sufficiently low. Consequently, a power generator having a plurality of fuel cells laminated together exhibits high power-generating efficiency with less heat loss caused by a Joule heat.

20 Claims, 2 Drawing Sheets

FIG.1A

FIG.1B (PRIOR ARTS)

SEPARATOR FOR LOW TEMPERATURE TYPE FUEL CELL AND METHOD OF PRODUCTION THEREOF

BACKGROUND OF THE INVENTION

1. Field of the Invention

The present invention relates to a metallic separator of a fuel cell workable at a relatively low temperature, such as a solid macromolecular fuel cell, and a manufacturing method thereof.

2. Background Information

A solid macromolecular fuel cell has such advantages that it works at a temperature below 100° C. and that it starts working in a short time, compared with other types of fuel cells. Since such the fuel cell has a structure composed of all solid members, it is easily maintained in an operable state and applicable for various uses subjected to vibrations or impacts. In addition, the fuel cell can be designed to a small size due to high power density. The fuel cell also has good fuel efficiency with less noise. Accounting these advantages, application of the fuel cell to a motor installed in an electric automobile or the like has been researched and examined so far. If fuel cells which cover a long travelling distance similar to that of a gasoline engine is provided, an automobile which installs such fuel cells therein does not substantially put any harmful influences on the environment due to no generation of $SO_x$ or $NO_x$ with a reduction of $CO_2$ by half.

A conventional solid macromolecular fuel cell has a solid macromolecular membrane containing a proton-exchanging group in its molecular structure. The membrane acts as a proton-conductive electrolyte. An interior of the fuel cell is divided into two zones by the membrane. A fuel gas such as hydrogen is supplied to one of the zones, while an oxidizing gas such as oxygen is supplied to the other zone, in the same manner as other types of fuel cells.

Figure 1A:
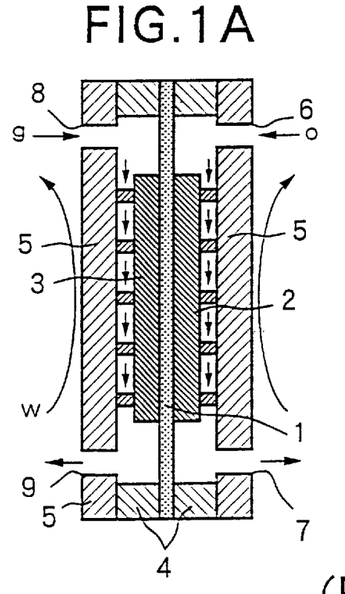
FIG. 1A is a sectional view illustrating an inner structure of a conventional fuel cell using a solid macromolecular membrane as an electrolyte.
Figure 1B:
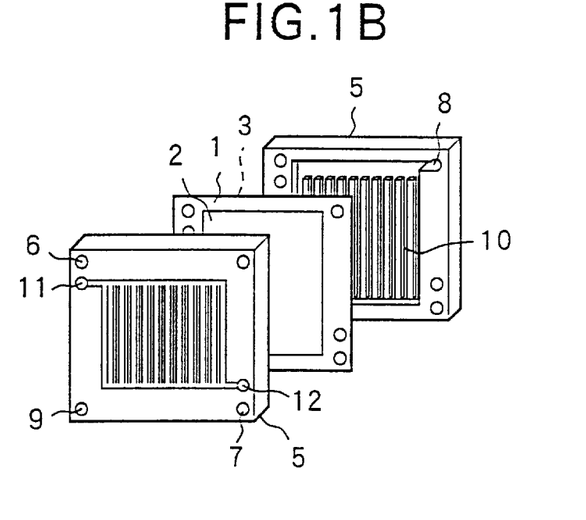
FIG. 1B is a perspective view of the conventional fuel cell of FIG. 1A in a dismantled state.

The fuel cell has an inner structure schematically illustrated in FIGS. 1A and 1B. An air electrode 2 and a hydrogen electrode 3 are coupled to both sides of a solid macromolecular membrane 1, respectively. Both sides of the membrane 1 are faced through gaskets 4 to separators 5. An air-supply hole 6 and an air-discharge hole 7 are formed in the separator 5 at the side of the air electrode 2, while a hydrogen-supply hole 8 and a hydrogen-discharge hole 9 are formed in the other separator 5 at the side of the hydrogen electrode 3.

A plurality of grooves 10 which extend along flowing directions of hydrogen g and oxygen or air o are formed in the separators 5, in order to uniformly distribute hydrogen g and oxygen or air o. Cooling water w is fed through water-supply holes 11, circulated in the separators 5 and discharged through water-discharge holes 12 by water-cooling means provided in the separators 5, so as to release a heat during power generation.

Hydrogen g, which is fed through the hydrogen-supply hole 8 to a gap between the hydrogen electrode 3 and the separator 5, converts to a proton after discharge of an electron. The generated proton permeates through the solid macromolecular membrane 1, accepts an electron at the side of the air electrode 2, and burns with oxygen or air o which passes through a gap between the air electrode 2 and the separator 5. Consequently, an electric power is gained by charging a load between the air electrode 2 and the hydrogen electrode 3.

Since an electro motive force per one fuel cell is very tiny, a plurality of fuel cells is laminated together to gain a voltage necessary for practical use, as shown in FIG. 1B. Herein, a solid macromolecular membrane sandwiched between separators is handled as one unit. Due to the constitution that a plurality of fuel cells is laminated together, power-generating efficiency is significantly affected by resistance of the separators 5. A separator material having good electric conductivity with low contact resistance is necessary for improvement of power-generating efficiency. In this regard, graphite separators have been used so far with the same idea as that for a phosphate fuel cell, as disclosed in OHM Vol. 83, No. 7, pp. 55–61, and FUJI JIHOH Vol. 68, No. 3, pp. 164–167.

Such a graphite separator is offered by cutting a graphite block to an objective shape and machining the shaped graphite block to form various holes and grooves. The cutting-machining process excessively consumes graphite material and needs expensive processing fees, so that a fuel cell as a whole is very expensive. The cutting-machining process is also inferior of productivity. Besides, a separator made of brittle graphite is easily broken or damaged by vibrations, impacts and so on. In order to overcome these disadvantages of a graphite separator, JP8-180883 A1 proposed a method of manufacturing a separator from a metal sheet by pressing, punching and so on.

However, when a metal sheet is used as a material for a separator of a fuel cell, there appears another problem. That is, a zone at a side of the air electrode 2 for passage of oxygen or air o is an acid atmosphere with pH 2–3. There has not been developed a metallic material, which sufficiently endures in a strong acid atmosphere and exhibits properties necessary for use as a separator, e.g. superior electric conductivity, low contact resistance with electrodes and corrosion resistance.

An acid-resistant material such as stainless steel could be used as a metallic material endurable in an acid atmosphere. Such a material exhibits excellent acid-resistance due to a passivated layer formed on its surface, but the passivated layer raises surface or contact electric resistance of the material with hydrogen and air electrodes. Elevation of the contact resistance means generation of a big quantity of a Joule heat at contact planes of separators to the hydrogen and air electrodes. Generation of the Joule heat causes wasteful consumption of an electric power gained by fuel cells, resulting in decrease of power-generating efficiency. Other metal sheets ordinarily also have oxide layers, which raise contact resistance, thereon.

Au is a metal material which does not have a passivated or oxide layer on its surface, and endurable in an acid atmosphere. However, Au is a very expensive material, so that it can not be practically used as a proper material for a separator of a fuel cell. Pt is also a metal material which is resistant to formation of a passivated or oxide layer on its surface and endurable in an acid atmosphere. However, Pt can not be used as a separator material due to its expensiveness.

In addition, a metal material for use as a separator shall be good of workability, since a plurality of grooves 10 or flanges for passages of hydrogen and air are formed by pressing, punching and so on. Workability of the metal material could be improved by applying an organic macromolecular film or a lubricating agent onto a surface of the metal material. However, application of an organic macromolecular film or lubricating agent raises contact resistance of the metal material, so that a large quantity of a Joule heat would be generated in a power generator having a plurality of fuel cells laminated. Generation of a Joule heat means a loss of an electric power and reduces a power-generating efficiency of the power generator.

After a metal material to which a lubricating agent was applied is worked to an objective shape, the metal material shall be subjected to post-treatment such as degreasing and rinsing. Such post-treatment means an increase of processing steps, and also needs great expenditures for treatment of waste liquids. If the worked metal material is degreased using an organic or flon solvent, the atmosphere would be deteriorated by diffusion of the solvent. When an organic film is applied onto a surface of a metal material, the metal material can be worked to an objective shape without use of a lubricating agent. However, contact resistance of the metal material is raised by the applied organic film, and also the organic film is peeled off or dissolved away from a surface of the metal material due to its poor endurance in an acidic atmosphere.

SUMMARY OF THE INVENTION

The present invention is a metallic separator which eliminates above-mentioned problems. Excellent electric conductivity and low contact resistance of the metallic separator is ensured without decrease of acid resistance by dotted distribution of carbonaceous particles on a surface of a stainless steel or formation of a metal plating layer or a paint film, in which carbonaceous particles are dispersed, on a surface of a stainless steel.

A first-type separator for a low-temperature fuel cell according to the present invention includes adhesion of carbonaceous particles onto a surface of a separator made from a corrosion-resistant metal sheet which has an oxide layer preformed in a corrosive atmosphere. A representative metal sheet as a substrate is a stainless steel having a passivated layer on its surface. Carbonaceous particles are preferably applied onto the surface of the substrate sheet with dotted distribution.

Carbonaceous particles are pressed onto a stainless steel sheet by applying the carbonaceous particles onto a surface of the stainless steel sheet and then rolling the stainless steel sheet with a reduction ratio of approximately 0.1–50%, to improve adhesiveness and peeling-resistance of carbonaceous particles onto the stainless steel substrate. The stainless steel sheet may be heat-treated after pressing the carbonaceous particles. A diffusion layer effective for adhesiveness is formed between the carbonaceous particles and the stainless steel substrate by the heat treatment. The carbonaceous particles may be carbon black or graphite particles.

A second-type separator has a stainless steel substrate coated with a metal plating layer in which carbonaceous particles are dispersed in a state exposed to the atmosphere. The plating layer may be a Ni—Cr, Ti, Ta or Ti—Ta layer. The carbonaceous particles to be dispersed in the plating layer may be carbon black or graphite particles. The Ni—Cr plating layer preferably contains approximately 5–60 wt. % Cr and optionally approximately 0.3–40 wt. % Mo.

A third-type separator has a carbon-bonded layer composed of carbonaceous particles bonded through a diffusion layer onto a surface of a stainless steel substrate. Fine granular carbon adheres onto surfaces of the carbonaceous particles in the carbon-bonded layer. The carbon-bonded layer can be formed by applying a carbonaceous particle-dispersed paint onto the stainless steel substrate, and then decomposing and vanishing organic components with a heat to retain the carbonaceous particles on the surface of the stainless steel substrate. Thermal decomposition of the paint film may be performed by heat-treatment at about 300–1150° C. in a non-oxidizing atmosphere. Before the heat-treatment, the stainless steel sheet coated with the paint film may be rolled with a reduction ratio of 0.1–50%.

PREFERRED EMBODIMENT OF THE PRESENT INVENTION

The present invention uses. an austenitic or austenite-ferrite dual phase stainless steel of superior acid resistance as a substrate. Since a substrate for a separator of a fuel cell requires endurance from corrosive attacks of non-oxydizing acid as well as oxydizing acid, such a stainless steel contains Ni in addition to Cr as alloying components to improve acid-resistance. Due to excellent acid resistance of the substrate itself, a separator made of such a stainless steel exhibits sufficient endurance even when pinholes or cracks occur in a plating layer formed on its surface.

An austenitic stainless steel suitable for such a purpose contains around 14–35 wt. % Cr and around 5–60 wt. % Ni. Approximate compositions of the austenitic stainless steel are as follows as an example: 0.008–0.2 wt. % C, 0.05–5.0 wt. % Si, 0.1–5.0 wt. % Mn, 5.0–60 wt. % Ni, 14–35 wt. % Cr and the balance being Fe except optional elements and inevitable impurities.

An austenite-ferrite dual phase stainless steel suitable for such a purpose contains around 17–35 wt. % Cr and around 2–60 wt. % Ni. Approximate compositions of the dual phase stainless steel are as follows as an example: 0.008–0.2 wt. % C, 0.05–5.0 wt. % Si, 0.1–5.0 wt. % Mn, $2.0_{14\ 60}$ wt. % Ni, 17–35 wt. % Cr and the balance being Fe except optional elements and inevitable impurities.

If Cr content in the stainless steel is less than approximately 14 wt. %, a separator would be inferior of endurance in a corrosive atmosphere including an oxydizing acid. If Cr content exceeds approximately 35 wt. % on the contrary, the stainless steel would exhibit great reforming resistance resulting in poor workability during pressing or the like. If Ni content is less than approximately 2 wt. %, a separator would be inferior of acid resistance in a corrosive atmosphere including a non-oxydizing acid. The effect of Ni on acid resistance is saturated at approximately 60 wt. % Ni, and further improvement in acid resistance is not recognized by addition of Ni more than approximately 60 wt. %. Besides, addition of excessive amount of Ni increases a cost of a stainless steel.

Acid resistance of a stainless steel substrate can be further improved by addition of one or more of Mo, Cu and N. When a fuel cell is operated in such the state that a current per a surface unit is elevated for increase of a power density, a separator is exposed to an acidic atmosphere with a lower pH value. Corrosion attacks under such severe conditions are suppressed by addition of one or more of approximately 0.2–7 wt. % Mo, approximately 0.1–5 wt. % Cu and approximately 0.02–0.5 wt. % N to a stainless steel. Acid resistance of the stainless steel is also improved by addition of a small amount of Ti, Nb and/or Zr as occasion demands.

The first-type separator has a stainless steel substrate onto which carbon particles such as graphite particles or carbon black aggregates directly adhere with dotted distribution. Graphite particles and carbon black are of high purity and superior acid resistance free from faults such as formation of an oxide film or the like caused by impurities. The high-purity graphite particles or carbon black also effectively protect a solid macromolecular membrane of a fuel cell from contamination. If such an unburnt product of petroleum or coke as soot or tar is used as carbonaceous particles, oxide films or the like would be easily formed on the carbonaceous particles due to impurities included therein. Such impurities also cause contamination of a solid macromolecular membrane and inferior performance of a fuel cell itself.

Carbonaceous particles such as graphite particles or carbon black aggregates exhibit low contact resistance and superior acid resistance without formation of an oxide film on their surfaces. In addition, a surface of a stainless steel substrate onto which carbonaceous particles adhere is of good affinity with air and hydrogen electrodes, since these electrodes are mainly made of a carbonaceous material. Consequently, contact resistance of the separator is remarkably lowered, so that a power generator comprising a plurality of fuel cells laminated together efficiently outputs an electric power with less Joule heat.

Figure 2A:
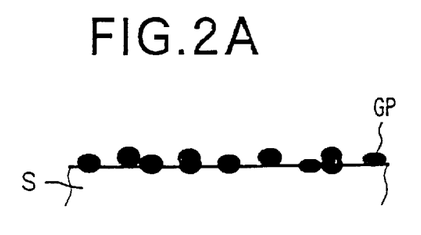
FIG. 2A is a sectional view illustrating a stainless steel substrate on which graphite particles are applied with a dotted distribution.

Each graphite particle GP can be individually applied onto a surface of a stainless steel substrate S due to its size relatively bigger than carbon black, as shown in FIG. 2A. Application of graphite particles GP with dotted distribution may be performed by scrubbing the stainless steel substrate S with felt impregnated with graphite particles or a roll around which the same felt is wound. Graphite particles GP are pressed onto a surface of the stainless steel substrate S by rolling the stainless steel substrate with a reduction ratio of about 0.1–50% after application of graphite particles GP. Carbon black is also applied onto a stainless steel substrate S in the same manner.

Figure 2B:
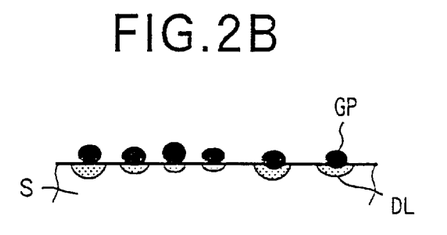
FIG. 2B is a sectional view illustrating a stainless steel substrate having graphite particles bonded through a diffusion layer onto its surface.

After graphite particles GP are pressed onto the stainless steel substrate S, the stainless steel substrate S is preferably heat-treated to form a diffusion layer DL between the stainless steel substrate S and each graphite particle GP, as shown in FIG. 2B. The diffusion layer DL effectively improves adhesiveness of the graphite particle GP to the stainless steel substrate S. since the graphite particles GP home improved adhesiveness, they are not peeled off the surface of the stainless steel S. when the stainless steel S is subjected to pressing, corrugating or the like during which the surface of the stainless steel substrate S is scrubbed with dies. The diffusion layer DL is also effective for further reduction of contact resistance, since electric conduction to the stainless steel substrate S is assured through the diffusion layer DL.

Figure 2C:
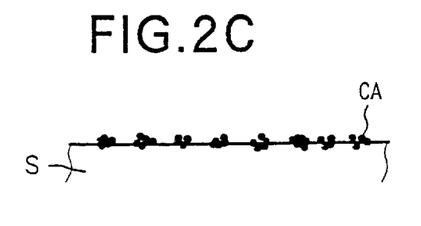
FIG. 2C is a sectional view illustrating a stainless steel substrate onto which aggregates of carbon black are applied with a dotted distribution.
Figure 2D:
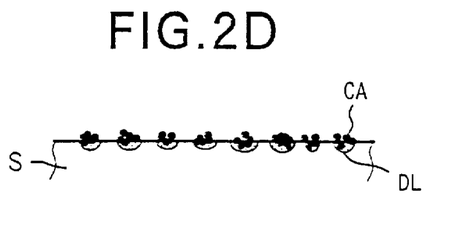
FIG. 2D is a sectional view illustrating a stainless steel substrate having aggregates of carbon black bonded through a diffusion layer onto its surface.

Carbon black comprises very fine particles of approximately 1 $\mu$m or less in size and likely aggregate. When carbon black is used as a carbonaceous material, carbon black adheres as aggregates CA onto a surface of a stainless steel substrate S, as shown in FIG. 2C. The carbon black aggregates CA may be also pressed onto the surface of the stainless steel substrate S in the same way as for graphite particle GP. Adhesiveness of the carbon black aggregates CA is also improved by formation of a diffusion layer DL, as shown in FIG. 2D, by heat-treatment after pressing.

The graphite particles GP or the carbon black aggregates CA are preferably dispersed with dotted distribution onto a surface of the stainless steel substrate S, as shown in each of FIGS. 2A–2D. The dotted distribution suppresses accumulation of a stress which occurs during working such as bending or drawing with reformation, so that the graphite particles GP or the carbon black aggregates CA are prevented from dropping-out or peeling-off. If a surface of the stainless steel substrate S is completely coated with the graphite particles GP or the carbon black aggregates CA in such the state that each particle or aggregate is bonded together, a stress which occurs during machining is not released to anywhere and consequently accumulated in a boundary between the stainless steel substrate S and the graphite particle GP or the carbon black aggregate CA. Due to such accumulation of a stress, the graphite particles GP or the carbon black aggregate CA is easily peeled off or dropped out of the stainless steel substrate S.

A second-type separator for a low-temperature fuel cell has a metal plating layer in which carbonaceous particles are dispersed. For instance, a Ni—Cr plating layer PL formed on a surface of a stainless steel substrate S contains carbonaceous particles such as graphite particles GP or carbon black aggregate CA dispersed therein, as shown in each of FIGS. 3A–3D. This separator is useful not only for a solid macromolecular fuel cell shown in FIG. 1 but also for an alkali fuel cell.

The plating layer PL in which the graphite particles GP or carbon black aggregates CA are dispersed is formed by a vapor depositing coating method, an electroplating method or the like. In the case of vapor deposition coating, a surface of a stainless steel substrate is activated, carbonaceous particles are applied onto the activated surface, and Ni and Cr vapors with a predetermined flow ratio are introduced on to the surface so as to deposit Ni and Cr. In the case of electroplating, a plating solution such as a composite plating solution containing nickel and chromium chlorides and suspending carbonaceous particles therein is used for co-precipitation of the carbonaceous particles during deposition of Ni and Cr.

Graphite particles GP are dispersed in the Ni—Cr plating layer PL in the state that each particle is exposed on a surface of the plating layer PL. The exposure of the graphite particles GP is controlled by conditions for formation of the Ni—Cr plating layer PL. Some amount of Ni or Cr may be deposited on the graphite particles GP during formation of the Ni—Cr plating layer PL. However, a Ni or Cr layer deposited on the graphite particles GP is spontaneously dropped out due to poor adhesiveness, so that the graphite particles GP are exposed on the surface without necessity of any special treatment. Even if the Ni or Cr layer deposited on the graphite particles GP is hardly dropped out, removal of such the Ni or Cr layer is facilitated by brushing the Ni—Cr plating layer as occasion demands.

Figure 3A:
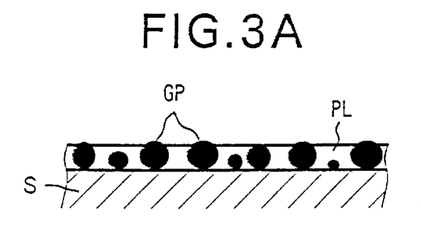
FIG. 3A is a sectional view illustrating a stainless steel substrate coated with a vapor-deposition Ni—Cr layer in which graphite particles are dispersed.

When graphite particles GP relatively big in size are used, each graphite particle GP is dispersed to a Ni—Cr plating layer PL in an exposed state, as shown in FIG. 3A.

Figure 3B:
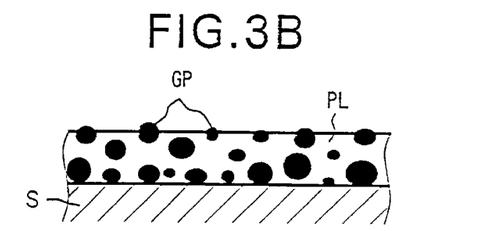
FIG. 3B is a sectional view illustrating a stainless steel substrate coated with an electroplating Ni—Cr layer in which graphite particles are dispersed.
Figure 3C:
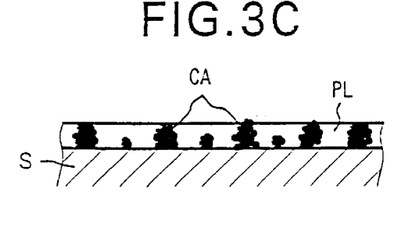
FIG. 3C is a sectional view illustrating a stainless steel substrate coated with a vapor-deposition Ni—Cr layer in which aggregates of carbon black are dispersed.

When a size of graphite particles GP is similar to a thickness of a Ni—Cr plating layer PL, each graphite particle GP serves as a direct electroconductive channel between a surface of the Ni—Cr plating layer PL and a stainless steel substrate S, as shown in FIG. 3B. When a thick Ni—Cr plating layer is formed on a stainless steel substrate S, as shown in FIG. 3C, such direct electroconductive channels are decreased in number, but low contact resistance is achieved due to exposure of graphite particles GP on a surface of the Ni—Cr plating layer PL. The graphite particles GP dispersed in the Ni—Cr plating layer PL are also effective for improvement of electric conductivity of the Ni—Cr plating layer PL itself.

Figure 3D:
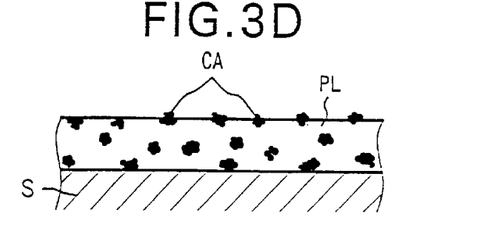
FIG. 3D is a sectional view illustrating a stainless steel substrate coated with an electroplating Ni—Cr layer in which aggregates of carbon black are dispersed.

On the other hand, carbon black, which is very minute particles of approximately 1 µm or less in size and easy to aggregate, is dispersed as carbon black aggregates CA in a Ni—Cr plating layer PL, as shown in FIG. 3C or 3D. Dispersion of such carbon black aggregates CA is also effective for decreasing of contact resistance of the Ni—Cr plating layer PL.

An effect of carbonaceous particles such as graphite particles GP or carbon black aggregates CA on decrease of contact resistance or improvement of electric conductivity is clearly noted, when the carbonaceous particles are dispersed in the plating layer PL at a ratio of around 0.01–500 mg/m$^2$. If an amount of the dispersed carbonaceous particles is less than 0.01 mg/m$^2$, carbonaceous particles exposed on the plating layer PL are reduced in number due to shortage, so as not to sufficiently realize the effect on decrease of contact resistance. If an amount of the dispersed carbonaceous particles exceeds approximately 500 mg/m$^2$ on the contrary, the effect on decrease of contact resistance is saturated, but the plating layer PL is embrittled and likely peeled off a stainless steel substrate S.

A Ni—Cr plating layer PL in which graphite particles GP are dispersed sufficiently endures against oxidizing and non-oxidizing acids. Due to this superior acid resistance, the Ni—Cr plating layer PL effectively improves durability of a separator which is installed in a low-temperature fuel cell and exposed not only to an oxidizing atmosphere for passage of oxygen or air o but also to an oxygen-free non-oxidizing atmosphere at a gap.

A Ni—Cr plating layer PL preferably contains around 5–60 wt. % Cr for acid resistance in both of oxidizing and non-oxidizing atmospheres. If Cr content in the Ni—Cr plating layer PL is less than around 5 wt. %, the Ni—Cr plating layer PL is of inferior acid resistance in an oxidizing atmosphere. If Cr content exceeds around 60 wt. %, acid resistance in a non-oxidizing atmosphere is inferior due to shortage of Ni content in return. Acid resistance of the Ni—Cr plating layer PL is further improved by addition of approximately 0.3–40 wt. % Mo. An effect of Mo on improvement of acid resistance is clearly noted when Mo content is about 0.3 wt. % or more. But, excessive addition of Mo more than about 40 wt/ % would rather deteriorate acid resistance.

Carbonaceous particles such as graphite particles GP or carbon black aggregates CA exhibit sufficiently low contact resistance and excellent acid resistance without formation of oxide films thereon. In addition, a Ni—Cr plating layer in which graphite particles GP or carbon black aggregates CA are dispersed is of good affinity to air and hydrogen electrodes which are made of carbonaceous material and held in contact with a separator in a fuel cell. Contact resistance is further reduced due to such good affinity. Consequently, when a plurality of cells are laminated together, a power generator of superior of performance is constructed while suppressing generation of a Joule heat.

Carbonaceous particles are prevented from dropping-out from a Ni—Cr plating layer PL during pressing or punching a stainless steel substrate S coated with the plating layer PL, since the carbonaceous particles are firmly retained in the plating layer PL. Due to good workability, the stainless steel substrate S coated with the plating layer PL can be reformed to a predetermined shape suitable for a separator.

A plating layer PL may be a Ti, Ta or Ti—Ta alloy layer instead of the Ni—Cr layer. A Ti, Ta or Ti—Ta alloy plating layer PL, in which carbonaceous particles such as graphite particles GP or carbon black aggregates CA are dispersed, is formed on a surface of a stainless steel substrate S by applying carbon particles onto the surface of a stainless steel substrate S and then introducing one or both of Ta and Ti vapors with a predetermined flow ratio so as to deposit Ta and/or Ti on the surface of the stainless steel substrate S.

Ta or Ti reacts with even a small amount of oxygen and forms a passive film on a plating layer PL. The plating layer PL coated with the passive film exhibits excellent resistance to both of oxidizing and non-oxidizing acids. A Ta—Ti alloy plating layer PL is also of superior acid resistance in the same meaning. In addition, carbonaceous particles are firmly retained in the Ta, Ti or Ta—Ti alloy plating layer PL, since Ta and Ti are reactive with carbon.

Figure 4A:
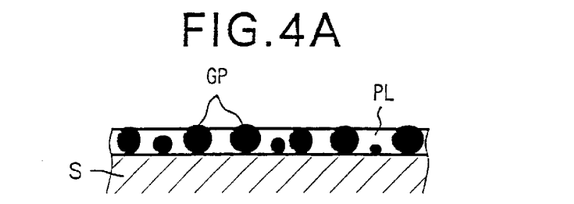
FIG. 4A is a sectional view illustrating a stainless steel substrate coated with a metal plating layer in which graphite particles are dispersed.
Figure 4B:
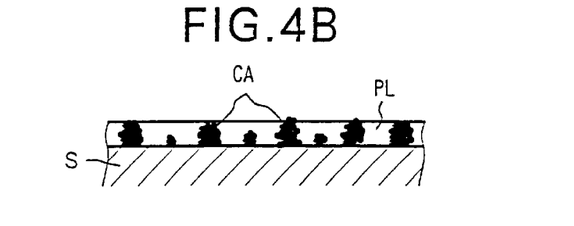
FIG. 4B is a sectional view illustrating a stainless steel substrate coated with a metal plating layer in which aggregates of carbon black are dispersed.

Graphite particles GP relatively big in size are dispersed to a plating layer PL in an exposed state, as shown in FIG. 4A. When carbon black very minute in size is used, carbon black aggregates CA are dispersed in a plating layer PL, as shown in FIG. 4B.

Exposure of graphite particles GP or carbon black aggregates CA is controlled by conditions for formation of a plating layer PL. In this case, a Ta, Ti or Ta—Ti alloy layer deposited on the graphite particles GP or the carbon black aggregates CA is also spontaneously dropped out due to poor adhesiveness, and consequently the graphite particles GP or the carbon black aggregates CA are exposed on a surface of the plating layer PL without necessity of any special treatment.

A Ta, Ti or Ta—Ti alloy plating layer PL formed by a vapor deposition coating method is relatively thin, so that graphite particles GP or carbon black aggregates CA serves as direct electroconductive channels between a surface of the plating layer PL and the stainless steel substrate S.

Figure 5:
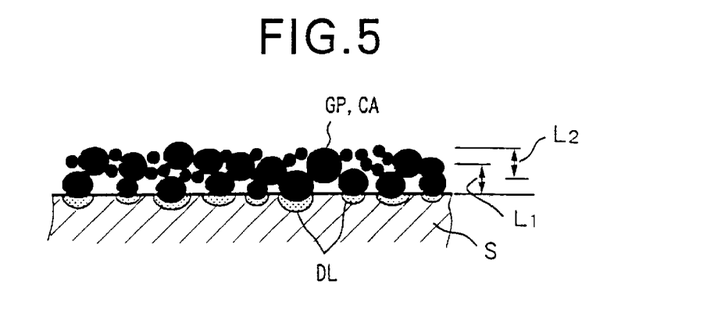
FIG. 5 is a sectional view illustrating a stainless steel substrate having a carbon-bonded layer to which fine granular carbon adheres.

Carbonaceous particles such as graphite particles GP or carbon black aggregates CA may be dispersed on a surface of a stainless steel substrate S by another method. That is, a paint in which graphite particles GP or carbon black aggregates CA are dispersed is applied onto a surface of a stainless steel substrate S, and then organic components in the paint film are decomposed and vanished with a heat so as to refrain the graphite particles GP or the carbon black aggregates CA on the surface of the stainless steel substrate S. As shown in FIG. 5a third-type separator for a low-temperature fuel cell produced in this way comprises a stainless steel substrate S, a carbon-bonded layer $L_1$ formed on a surface of the stainless steel substrate S and an adhesion layer $L_2$ of granular carbon adhering onto carbonaceous particles of the carbon-bonded layer $L_1$.

The carbon-bonded layer $L_1$ and the adhesion layer $L_2$ each composed of carbonaceous particles can be provided by preparing a paint in which carbonaceous particles are dispersed, applying the paint onto a stainless steel substrate S and then heating the stainless steel substrate S at about 300–1150° C. in a non-oxidizing atmosphere.

Organic components of the paint are decomposed by such heat treatment and vanished from the surface of the stainless steel substrate S. In this sense, no restrictions are put on a kind of a paint. Polyester, acrylic, polyolefin, polyurethane or these mixtures may be used as a paint component, for instance.

A mixing ratio of carbonaceous particles in a paint 100 parts by weight is preferably around 0.05–60 parts by weight. If the mixing ratio is less than approximately 0.05 parts by weight, a carbon-bonded layer $L_1$ in which carbonaceous particles are sufficiently dispersed can not be formed, so that contact resistance of a stainless steel substrate S is not decreased to a lower level. Addition of carbonaceous particles in an excessive amount above approximately 60 parts by weight on the contrary causes poor applicability of a paint and also inferior adhesiveness of a paint film to a stainless steel substrate S.

A carbonaceous particle-dispersed paint film applied to a stainless steel substrate S is preferably about 5 $\mu$m or thinner, in order to assure adhesiveness of a carbon-bonded layer $L_1$ to the stainless steel substrate S. If a thickness of the paint film exceeds approximately 5 $\mu$m, too much gas would generate during heat treatment and cause peeling off of the paint film.

A stainless steel substrate S coated with a paint film in which carbonaceous particles are dispersed is heated at about 300–1150° C. in a non-oxidizing atmosphere such as $N_2$, $N_2+H_2$ or Ar. The carbonaceous particle-dispersed in the paint film remain as such on a surface of the stainless steel substrate S without oxidization due to the heat treatment in the non-oxidizing atmosphere. Carbon is partially diffused into the stainless steel substrate S by the heat treatment, so as to form a carbon-bonded layer $L_1$ to which carbonaceous particles are bonded through a diffusion layer DL to the stainless steel substrate S.

Organic components such as resins in the paint film are decomposed by heat treatment and partially left as decomposition residues on the surface of the stainless steel substrate S. Carbonaceous decomposition residues derived from organic components are partially transferred to a carbon-bonded layer $L_1$, while the remainder is converted to a adhesion layer $L_2$ bonded to the carbon-bonded layer $L_1$. Since the carbon-bonded layer $L_1$ and the adhesion layer $L_2$ have the structure that each particle is bonded together without covering a whole surface of the stainless steel substrate S, the stainless steel substrate S keeps its good workability after formation of the carbon-bonded layer $L_1$ and the adhesion layer $L_2$. The adhesion layer $L_2$ serves as a lubricating agent during pressing or punching, so as to further improve workability of the stainless steel substrate S.

A stainless steel substrate S coated with a paint film may be rolled with a reduction ratio of around 0.1–50% before heat treatment. Such rolling effectively improves adhesiveness of carbonaceous particles to the stainless steel substrate S. Carbonaceous particles improved in adhesiveness by the rolling promotes diffusion reaction to the stainless steel substrate S during heat treatment in the following step. Consequently, a carbon-bonded layer $L_1$ is firmly bonded to the stainless steel substrate S, so as to effectively decrease contact resistance. The effect of rolling on adhesiveness is clearly noted at a reduction ratio of around 0.1% or more. But an excessive rolling ratio above around 50% means excessive deformation of the stainless steel substrate S and causes peeling-off of the paint film. Such the effect on promotion of around diffusion reaction is saturated at a reduction ratio of 50%.

Since an adhesion layer $L_2$ of granular carbon on a surface of a stainless steel substrate S serves as a lubricating agent, the stainless steel substrate S is reformed to even a complicated separator shape without rupture or cracking. In addition, a separator obtained in this way exhibits sufficiently low contact resistance due to presence of the carbon-bonded layer $L_1$ and the adhesion layer $L_2$ on the surface of the stainless steel substrate S, so that a power generator having such separators installed therein is of superior power generating efficiency and also durability under operational conditions exposed to a severely corrosive acidic atmosphere.

Since a carbon-bonded layer $L_1$ of carbonaceous particles is bonded through a diffusion layer DL to a stainless steel substrate S, the carbon-bonded layer $L_1$ is firmly fixed to the stainless steel substrate S. Consequently, even if such deformation as bending or elongation occurs in the stainless steel substrate S during reformation, accumulation of stress in the carbon-bonded layer $L_1$ is suppressed so that the carbon-bonded layer $L_1$ is prevented from peeling off from the stainless steel substrate S. The superior adhesiveness of the carbon-bonded layer $L_1$ enables reformation of the stainless steel substrate S to a proper shape suitable for a separator. Workability of the stainless steel substrate is further improved by rolling after formation of the carbonaceous particle-dispersed paint film but before heat treatment.

Carbonaceous particles such as graphite particles GP or carbon black aggregates CA exhibits sufficiently low contact resistance and excellent acid resistance without formation of oxide films thereon. In addition, the carbon-bonded layer $L_1$ and the adhesion layer $L_2$ is of superior affinity to air and hydrogen electrodes which are made of carbonaceous material and held in contact with a separator, so as to further decrease contact resistance. Consequently, a power generator having a plurality of fuel cells laminated together is superior in power generating efficiency with less Joule heat.

Other features of the present invention will be apparent from the following examples. However, these examples do not put any restrictions on the scope of the present invention.

EXAMPLE 1

Stainless steel sheets having compositions shown in Table 1 were used as stainless steel substrates S. Carbon black of 0.05 $\mu$m in average size and graphite particles of 3 $\mu$m in average size were used as carbonaceous particles.

TABLE 1

STAINLESS STEELS USED IN THE EXAMPLES

| steel kind | compositions except Fe (wt. %) | | | | | | | |
|---|---|---|---|---|---|---|---|---|
| | C | Si | Mn | Ni | Cr | Mo | Cu | N |
| A | 0.05 | 0.57 | 0.91 | 8.9 | 18.5 | — | — | — |
| B | 0.02 | 0.48 | 0.55 | 25.3 | 24.5 | 5.1 | 0.52 | 0.15 |
| C | 0.01 | 0.83 | 0.66 | 6.1 | 24.8 | 3.0 | 0.45 | 0.13 |

Steel A: austenitic stainless steel
Steel B: austenitic stainless steel
Steel C: austenite-ferrite dual phase stainless steel Carbon black or graphite particles were applied with dotted distribution at an adhesion ratio of 5–10 mg/m$^2$ by scrubbing a stainless steel sheet with felt impregnated with carbon black or graphite particles. Due to very fine particle size, carbon black was applied as aggregates CA with dotted distribution onto a surface of the stainless steel substrate S. Graphite particles GP were individually applied with dotted distribution free from aggregation on a surface of the stainless steel substrate S.

The stainless steel substrate S was thereafter rolled with a reduction ratio of 2–3% so as to press the carbon black aggregates CA or the graphite particles GP onto the surface of the stainless steel substrate S for improvement of adhesiveness to the stainless steel substrate S. Some of the samples were further heated at 700° C. for 10 seconds, to generate a diffusion layer DL between the carbon black aggregates CA or the graphite particles GP and the stainless steel substrate S.

After the carbonaceous particles were applied with dotted distribution to the stainless steel substrate S, the stainless steel substrate S was tested for measurement of contact resistance and acid resistance. Contact resistance was measured by holding the stainless steel substrate S in contact with a carbon electrode with a load of 10 kg/cm$^2$ and detecting contact resistance therebetween. Acid resistance was measured by dipping the stainless steel substrate S in a sulfuric acid solution of pH 2 at 90° C. and measuring a corrosion loss after a predetermined time period. Samples prepared by coating a stainless steel sheet A with a Ni, Cu or Cr plating layer of 5 μm in thickness were subjected to the same tests for comparison.

Test results are shown in Tables 2 and 3. Contact resistance and acid resistance of the stainless steel substrates S to which carbon particles were pressed with dotted distribution were shown in Table 2, while contact resistance and acid resistance of the stainless steel substrates S which were further heat-treated to generate diffusion layers DL were shown in Table 3.

It is clearly noted from Table 2 that sample Nos. 1–6, that is, the stainless steel substrates to which carbon particles were pressed with dotted distribution, were bestowed with such properties as low contact resistance and excellent acid resistance necessary for a separator of a fuel cell. Sample Nos. 13–18 had contact resistance further decreased by the heat treatment to generate diffusion layers DL, as shown in Table 3.

On the other hand, any of sample Nos. 7–9, that is, stainless steel substrates without adhesion of carbon particles, were too high is contact resistance for use as a separator of a fuel cell. Sample Nos. 10, 12, that is, stainless steel substrates coated with Ni and Cr plating layers, exhibited low contact resistance, but big corrosion losses were detected so that these substrates were inappropriate as a separator of a fuel cell which is subjected to a corrosive atmosphere at a low pH value. A sample No. 11 was inferior both in contact resistance and acid resistance, so inappropriate as a separator of a fuel cell.

TABLE 2

EFFECT OF CARBON PARTICLES PRESSED WITH DOTTED DISTRIBUTION ON CONTACT RESISTANCE AND CORROSION LOSS (WITHOUT DIFFUSION LAYERS)

| Sample No. | Steel Kind | Applied Carbon Particles | Contact Resistance mΩ · cm$^2$ | Corrosion Loss g/m$^2$ · h | Note |
|---|---|---|---|---|---|
| 1 | A | Carbon Black | 15 | 0.00092 | Present |
| 2 | B | " | 21 | 0.00012 | Invention |
| 3 | C | " | 13 | 0.00015 | |
| 4 | A | Graphite Particles | 32 | 0.00089 | |
| 5 | B | " | 33 | 0.00014 | |
| 6 | C | " | 25 | 0.00011 | |
| 7 | A | Without adhesion | 307 | 0.00090 | Comparative |
| 8 | B | " | 279 | 0.00011 | Examples |
| 9 | C | " | 288 | 0.00012 | |
| 10 | — | Ni Plating | 26 | 0.17 | |
| 11 | — | Cu Plating | 120 | 0.098 | |
| 12 | — | Cr Plating | 36 | 0.0025 | |

TABLE 3

CONTACT RESISTANCE AND CORROSION LOSS OF STAINLESS STEEL SUBSTRATES TO WHICH CARBON PARTICLES WERE PRESSED AND THEN SUBJECTED TO HEAT-TREATMENT

| Sample No. | Steel Kind | Applied Carbon Particles | Contact Resistance MΩ · cm$^2$ | Corrosion Loss g/m$^2$ · h |
|---|---|---|---|---|
| 13 | A | Carbon Black | 5 | 0.00090 |
| 14 | B | " | 7 | 0.00015 |
| 15 | C | " | 6 | 0.00018 |
| 16 | A | Graphite Particles | 7 | 0.00097 |
| 17 | B | " | 8 | 0.00013 |
| 18 | C | " | 7 | 0.00019 |

EXAMPLE 2

In Example 2, stainless steel sheets shown in Table 1 were used as substrates. A Ni—Cr plating layer in which carbonaceous particles were dispersed was formed on a surface of each stainless steel substrate by the following vapor deposition coating or electroplating method.

Method 1: a Vapor Deposition Coating Method for Formation of a Ni—Cr Plating Layer Graphite particles of 2 μm in average size and carbon black of 0.03 μm in average size were used as carbonaceous particles. After a surface of a stainless steel sheet was activated in a vacuum chamber, the surface was scrubbed with felt impregnated with carbonaceous particles so as to apply carbonaceous particles to the surface of the stainless steel at an adhesion ratio of $3_{14\ 15}$ g/m$^2$. Thereafter, Ni and Cr were simultaneously sputtered at a deposition speed of 0.005 μm/second in the same vacuum chamber.

The Ni—Cr plating layer PL formed in this way was of 0.5 μm in thickness, and Cr content was 23 wt. %. Graphite particles GP and carbon black aggregates CA were dispersed in each plating layer PL, as shown in FIG. 3A and FIG. 3C, respectively.

Method 2: an Electroplating Method for Formation of a Ni—Cr Plating Layer

A plating solution was prepared by suspending carbon black of 0.03 μm in average size at a ratio of 300 g/l in an aqueous solution containing 0.6 mol/l $NiCl_2$, 0.9 mol/l $CrCl_2$, 2.2 mol/l $NH_4Cl$, 0.8 mol/l $H_3BO_3$, 1.2 mol/l glycine and 3 wt. % a surfactant. A stainless steel sheet having a surface activated was dipped in the plating solution held at 40° C. and electroplated at a current density of 10 $A/dm^2$.

A Ni—Cr plating layer PL formed in this way was of 5 μm in thickness, and Cr content was 40 wt. % on the basis of metal components in the plating layer PL. Graphite particles GP and carbon black aggregates CA were dispersed in each plating layer PL, as shown in FIG. 3B or FIG. 3D, respectively.

Each stainless steel substrate S coated with the plating layer PL in which carbonaceous particles were dispersed was tested for measurement of contact resistance and acid resistance by the same way as Example 1. Test results are shown in Table 4. It is noted from Table 4 that any of the stainless steel substrates S coated with the plating layer PL in which carbonaceous particles were dispersed had sufficiently low contact resistance and superior corrosion resistance so as to be suitable for a separator of a fuel cell.

Graphite particles of 2 μm in average size and carbon black of 0.03 μm in average size were used as carbonaceous particles. After a surface of each stainless steel sheet was activated in a vacuum chamber, the surface was scrubbed with felt impregnated with the carbonaceous particles so as to apply the carbonaceous particles at an adhesion ratio of 5–15 $g/m^2$ to the surface of the stainless steel substrate. Thereafter, one or both of Ta and Ti were simultaneously sputtered at a deposition speed of 0.004 μm/second in the same vacuum chamber. The plating layers PL formed in this way were of 0.5 μm in thickness. The graphite particles GP or the carbon black aggregates CA were dispersed in each plating layer PL, as shown in FIG. 4A and FIG. 4B, respectively.

Each stainless steel substrate S coated with the carbonaceous particle-dispersed plating layer PL was tested for measurement of contact resistance and acid resistance by the same way as Example 1. Test results are shown in Tables 5

TABLE 4

EFFECTS OF CARBONACEOUS PARTICLE-DISPERSED PLATING LAYERS ON CONTACT RESISTANCE AND CORROSION RESISTANCE

| Sample No. | Steel Kind | A Plating Layer | Applied Carbonaceous Particles | Contact Resistance mΩ · cm² | Corrosion Loss g/m² · h | Note |
|---|---|---|---|---|---|---|
| 1 | A | A Ni-Cr Plating | Carbon Black | 5 | 0.00023 | Method 1 |
| 2 | B | Layer containing | " | 5 | 0.00010 | |
| 3 | C | 23 wt. % Cr | " | 4 | 0.00011 | |
| 4 | A | | Graphite Particles | 10 | 0.00019 | |
| 5 | B | | " | 9 | 0.00010 | |
| 6 | C | | " | 10 | 0.00012 | |
| 7 | A | A Ni-Cr Plating | Carbon Black | 6 | 0.00035 | Method 2 |
| 8 | B | Layer containing | " | 6 | 0.00018 | |
| 9 | C | 40 wt. % Cr | " | 6 | 0.00018 | |
| 10 | A | | Graphite Particles | 12 | 0.00030 | |
| 11 | B | | " | 11 | 0.00010 | |
| 12 | C | | " | 11 | 0.00015 | |

EXAMPLE 3

Stainless steel sheets shown in Table 1 were used as substrates, and carbonaceous particle-dispersed plating layers were formed on the stainless steel substrates by a vacuum deposition coating method.

and 6. It is noted from these Tables 5 and 6 that any of the stainless steel substrates S coated with the carbonaceous particle-dispersed plating layers PL had sufficiently low contact resistance and superior acid resistance so properties necessary for a separator of a fuel cell are satisfied.

TABLE 5

EFFECTS OF CARBONACEOUS PARTICLE-DISPERSED VACUUM DEPOSITION TA AND TI LAYERS ON CONTACT RESISTANCE AND CORROSION RESISTANCE

| Sample No. | Steel Kind | A Plating Layer | Applied Carbonaceous Powder | Contact Resistance mΩ · cm² | Corrosion Loss g/m² · h | Note |
|---|---|---|---|---|---|---|
| 1 | A | Ta | Carbon Black | 4 | 0.00025 | Present |
| 2 | B | | " | 3 | 0.00010 | Invention |
| 3 | C | | " | 3 | 0.00018 | |
| 4 | A | | Graphite Particles | 7 | 0.00033 | |
| 5 | B | | " | 10 | 0.00012 | |
| 6 | C | | " | 8 | 0.00019 | |
| 7 | A | Ti | Carbon Black | 5 | 0.00045 | |
| 8 | B | | " | 5 | 0.00018 | |
| 9 | C | | " | 5 | 0.00010 | |
| 10 | A | | Graphite Particles | 9 | 0.00040 | |
| 11 | B | | " | 7 | 0.00016 | |
| 12 | C | | " | 7 | 0.00021 | |

TABLE 6

EFFECTS OF CARBONACEOUS PARTICLE-DISPERSED
VACUUM DEPOSITION TA-TI LAYERS ON CONTACT
RESISTANCE AND CORROSION RESISTANCE

| Sample No. | Steel Kind | Ti Content (wt. %) In A Plating Layer | Applied Carbonaceous Powder | Contact Resistance mΩ·cm² | Corrosion Loss g/m²·h |
|---|---|---|---|---|---|
| 13 | A | 20 | Carbon Black | 7 | 0.00022 |
| 14 | B |  | " | 9 | 0.00011 |
| 15 | A |  | Graphite Particles | 8 | 0.00011 |
| 16 | A |  | " | 9 | 0.00025 |
| 17 | B |  | " | 9 | 0.00011 |
| 18 | C |  | " | 11 | 0.00010 |
| 19 | A |  | Carbon Black | 8 | 0.00035 |
| 20 | B | 40 | " | 6 | 0.00015 |
| 21 | C |  | " | 9 | 0.00016 |
| 22 | A |  | Graphite Particles | 11 | 0.00036 |
| 23 | B |  | " | 13 | 0.00012 |
| 24 | C |  | " | 10 | 0.00019 |
| 25 | A | 70 | Carbon Black | 8 | 0.00037 |
| 26 | B |  | " | 8 | 0.00014 |
| 27 | C |  | " | 8 | 0.00010 |
| 28 | A |  | Graphite Particles | 11 | 0.00038 |
| 29 | B |  | " | 10 | 0.00011 |
| 30 | C |  | " | 14 | 0.00016 |

EXAMPLE 4

Stainless steel sheets shown in Table 1 were used as substrates.

Various kinds of paints to be applied to the stainless steel substrates S were prepared by dispersing graphite particles of 1 μm in average size or carbon black of 0.05 μm in average size as carbonaceous particles in an aqueous polyester urethane paint.

After each paint was applied as a film of 0.2–1.2 μm in thickness to a stainless steel substrate S, the stainless steel substrate S was heated at 750° C. for 5 seconds in a $N_2$ atmosphere. Organic substances of the paint were decomposed by the heat treatment. Granular carbon as a decomposition residue was left as a part of an adhesion layer $L_2$ of 0.1–1.0 μm in average thickness on the surface of the stainless steel substrate S. The carbonaceous particles remaining after decomposition of organic substances were converted to a carbon-bonded layer $L_1$ of 0.01–1.0 μm in average thickness which was bonded through a diffusion layer DL to the stainless steel substrate S.

Each stainless steel substrate S coated with the carbon-bonded layer $L_1$ of carbonaceous particles and the adhesion layer $L_2$ of granular carbon was tested for measurement of contact resistance and acid resistance by the same way as Example 1. Test results are shown in Table 7. It is noted from Table 7 that any of the stainless steel substrates S coated with the carbon-bonded layer $L_1$ and the adhesion layer $L_2$ exhibited sufficiently low contact resistance and superior acid resistance so as to be suitable for a separator of a fuel cell.

TABLE 7

CONTACT RESISTANCE AND CORROSION LOSS
OF VARIOUS SEPARATORS MADE OF STAINLESS STEEL
COATED WITH BINDING AND ADHESION LAYERS

| Sample No. | Steel Kind | Applied Carbonaceous Particles | Average Thickness Of A Carbon-Bonded Layer (μm) | Contact Resistance MΩ·cm² | Corrosion Loss g/m²·h | Note |
|---|---|---|---|---|---|---|
| 1 | A | Carbon Black | 0.01 | 5 | 0.00089 | Present Invention |
| 2 | B | " | 0.02 | 4 | 0.00015 |  |
| 3 | C | " | 0.02 | 5 | 0.00018 |  |
| 4 | A | Graphite Particles | 0.8 | 8 | 0.00093 |  |
| 5 | B | " | 0.8 | 8 | 0.00013 |  |
| 6 | C | " | 1.0 | 7 | 0.00014 |  |

EXAMPLE 5

After a carbonaceous particle-dispersed paint was applied to each stainless steel sheet B shown in Table 1 under the same condition as Example 4, the stainless sheet was cold rolled at a reduction ratio shown in Table 8. The steel sheet was then heat treated under the same conditions as Example 4 to decompose and vanish organic substances in the paint. An obtained stainless steel substrate S, which was coated with carbon-bonded and adhesion layers $L_1$, $L_2$, was tested for measurement of contact resistance and acid resistance by the same way as Example 4. Test results are shown in Table 8.

It is noted from comparison of Table 8 with Table 7 that cold rolling prior to heat treatment is effective for on increase of contact resistance, and that decrease in degree of contact resistance becomes larger with an increase of a reduction ratio.

TABLE 8

EFFECTS OF REDUCTION RATIO ON
CONTACT RESISTANCE AND CORROSION LOSS

| Sample No. | Applied Carbonaceous Particles | Reduction Ratio % | Contact Resistance mΩ·cm² | Corrosion Loss g/m²·h |
|---|---|---|---|---|
| 7 | Graphite Particles | 0.2 | 7.1 | 0.00016 |
| 8 | " | 1.6 | 5.8 | 0.00015 |
| 9 | " | 5.8 | 5.1 | 0.00017 |
| 10 | " | 18.7 | 4.3 | 0.00017 |
| 11 | " | 35.6 | 3.9 | 0.00016 |
| 12 | " | 48.8 | 3.2 | 0.00016 |
| 13 | Carbon Black | 26.6 | 3.6 | 0.00015 |
| 14 | " | 49.1 | 2.9 | 0.00013 |

INDUSTRIAL APPLICABILITY

A separator according to the present invention as above-mentioned comprises an acid-resistant stainless steel substrate coated with a carbonaceous particle-dispersed layer to improve electric conductivity. The carbonaceous particle-dispersed layer is formed by pressing carbonaceous particles with dotted distribution onto a surface of the stainless steel substrate or by forming a plating or paint layer in which carbonaceous particles are dispersed on the surface of the stainless steel substrate. A carbonaceous particle-dispersed layer effective for improvement of electric conductivity may be prepared by decomposing and vanishing organic substances of a carbonaceous particle-dispersed paint layer formed on a surface of a stainless steel substrate.

The stainless steel substrate to which carbonaceous particles adhere with dotted distribution is superior both of electric conductivity and corrosion resistance, so useful as a separator of a low-temperature fuel cell. Due to excellent properties, a power generator having the structure that a plurality of low-temperature fuel cells are laminated together keeps its high performance for a long time with less corrosion even in a strong acid atmosphere and also suppresses a heat loss which would be derived from a Joule heat when a plurality of fuel cells are laminated. In addition, the metallic separator is manufactured with good productivity while avoiding increase of material and manufacturing costs.

What is claimed is:

1. A separator for a low-temperature fuel cell comprising a metal sheet substrate, on which an oxide film is generated in a corrosive atmosphere to keep acid resistance, and carbonaceous particles applied onto a surface of said metal sheet substrate.

2. The separator for a low-temperature fuel cell according to claim 1, wherein the metal sheet substrate is a stainless steel sheet, and the carbonaceous particles are applied with dotted distribution onto the surface of said stainless steel substrate.

3. The separator for a low-temperature fuel cell according to claim 2, wherein the carbonaceous particles are pressed onto the surface of the stainless steel substrate by rolling said stainless steel substrate at a reduction ratio of approximately 0.1–50%.

4. A separator for a low-temperature fuel cell comprising a metal sheet substrate, on which an oxide film is generated in a corrosive atmosphere to keep acid resistance, and carbonaceous particles applied onto a surface of said metal sheet substrate, wherein the carbonaceous particles are bonded through a diffusion layer to the surface of the substrate.

5. The separator for a low-temperature fuel cell according to claim 1, wherein the carbonaceous particles are carbon black or graphite particles.

6. The separator for a low-temperature fuel cell according to claim 2, further comprising a Ni—Cr plating layer, in which said carbonaceous particles are dispersed, formed on a surface of said stainless steel substrate, wherein said carbonaceous particles are exposed on a surface of said Ni—Cr plating layer.

7. The separator for a low-temperature fuel cell according to claim 2, further comprising a Ti, Ta or Ti—Ta alloy plating layer, in which said carbonaceous particles are dispersed, formed on a surface of said stainless steel substrate, wherein said carbonaceous particles are exposed on a surface of said Ti, Ta or Ti—Ta alloy plating layer.

8. The separator for a low-temperature fuel cell according to claim 6, wherein the carbonaceous particles are carbon black or graphite particles.

9. The separator for a low-temperature fuel cell, according to claim 6, wherein the Ni—Cr plating layer contains approximately 5–60 wt. % Cr.

10. The separator for a low-temperature fuel cell according to claim 9, wherein the Ni—Cr plating layer further contains approximately 0.3–40 wt. % Mo.

11. The separator for a low-temperature fuel cell according to claim 2, further comprising a carbon-bonded layer composed of carbonaceous particles bonded through a diffusion layer onto a surface of said stainless steel substrate and an adhesion layer of granular carbon adhering onto a surface of said carbon-bonded layer.

12. The separator for a low-temperature fuel cell according to claim 11, wherein the carbon-bonded layer is composed of carbonaceous particles which remain after decomposition and vanishment of organic substances in a carbonaceous particle-dispersed paint film which was applied onto a surface of the stainless steel substrate and then subjected to heat treatment.

13. A method of manufacturing a separator for a low-temperature fuel cell, comprising steps of:
providing a stainless steel substrate,
applying a paint in which carbonaceous particles are dispersed onto said stainless steel substrate, and
heating said stainless steel substrate at approximately 300–1150° C. in a non-oxidizing atmosphere.

14. The method of manufacturing a separator for a low-temperature fuel cell according to claim 13, wherein the stainless steel substrate coated with the paint film is rolled at a reduction ratio of approximately 0.1–50% prior to the heat treatment.

15. A separator for a low-temperature fuel cell comprising a metal sheet substrate, on which an oxide film is generated in a corrosive atmosphere to keep acid resistance, and carbonaceous particles applied onto a surface of said metal sheet substrate, wherein the metal sheet substrate is a stainless steel substrate, and the carbonaceous particles are applied with dotted distribution onto the surface of said stainless steel substrate, and wherein the carbonaceous particles are bonded through a diffusion layer to the surface of the substrate.

16. A separator for a low-temperature fuel cell comprising a metal sheet substrate, on which an oxide film is generated in a corrosive atmosphere to keep acid resistance, and carbonaceous particles applied onto a surface of said metal sheet substrate, wherein the metal sheet substrate is a stainless steel substrate, and the carbonaceous particles are applied with dotted distribution onto the surface of said stainless steel substrate by pressing the carbonaceous particles onto the surface of the stainless steel substrate by rolling said stainless steel substrate at a reduction ratio of approximately 0.1–50%, and wherein the carbonaceous particles are bonded through a diffusion layer to the surface of the substrate.

17. The separator for a low-temperature fuel cell according to claim 2, wherein the carbonaceous particles are carbon black or graphite particles.

18. The separator for a low-temperature fuel cell according to claim 3, wherein the carbonaceous particles are carbon black or graphite particles.

19. The separator for a low-temperature fuel cell according to claim 4, wherein the carbonaceous particles are carbon black or graphite particles.

20. The separator for a low-temperature fuel cell according to claim 7, wherein the carbonaceous particles are carbon black or graphite particle.

* * * * *

UNITED STATES PATENT AND TRADEMARK OFFICE
CERTIFICATE OF CORRECTION

PATENT NO. : 6,440,598 B1
DATED : August 27, 2002
INVENTOR(S) : Yasushi Fukui et al.

It is certified that error appears in the above-identified patent and that said Letters Patent is hereby corrected as shown below:

Column 1,
Line 15, "Since such the fuel" should read -- Since such fuel --.
Line 20, "Accounting these" should read -- Taking into account these --.
Line 23, "travelling" should read -- traveling --.
Line 24, "is provided" should read -- are provided --.

Column 4,
Line 51, "uses. an" should read -- uses an -- (delete period).

Column 5,
Line 5, "$2.0_{14\ 60}$ wt.% Ni" should read -- 2.0-60 wt.% Ni --

Column 6,
Line 10, substrate S. since" should read -- substrate S. Since --.
Line 12, "steel S. when" should read -- steel S, when --.

Column 7,
Line 42, "CA on decrease" should read -- CA on the decrease --.
Line 47, "than 0.01" should read -- than about 0.01 --.

Column 8,
Line 20, "of superior of performance" should read -- of superior performance --.
Line 42, "to both of oxidizing and" should read -- to both oxidizing and --.

Column 9,
Line 6, "refrain the graphite" should read -- retain the graphite --.
Line 8, "As shown in FIG. 5a" should read -- As shown in FIG. 5, a --.

Column 12,
Line 56, "$3_{14\ 15}$" should read -- 3-15 --.

UNITED STATES PATENT AND TRADEMARK OFFICE
CERTIFICATE OF CORRECTION

PATENT NO.    : 6,440,598 B1
DATED         : August 27, 2002
INVENTOR(S)   : Yasushi Fukui et al.

It is certified that error appears in the above-identified patent and that said Letters Patent is hereby corrected as shown below:

Column 16,
Lines 35-36, "for on increase" should read -- for an increase --.
Line 36, "and that decrease" should read -- and that a decrease --.

Signed and Sealed this

Twenty-eighth Day of January, 2003

JAMES E. ROGAN
*Director of the United States Patent and Trademark Office*